United States Patent
Keys et al.

(10) Patent No.: US 11,055,676 B2
(45) Date of Patent: Jul. 6, 2021

(54) ARTIFICIAL INTELLIGENCE FOR MINING CRYPTO CURRENCY WITH ACCESS POINT STRATUM POOLS OVER DATA COMMUNICATION NETWORKS

(71) Applicant: Fortinet, Inc., Sunnyvale, CA (US)

(72) Inventors: Samuel Joseph Keys, Laguna Niguel, CA (US); Nicholas Paul Martin, Long Beach, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/370,908

(22) Filed: Mar. 30, 2019

(65) Prior Publication Data
US 2020/0311697 A1   Oct. 1, 2020

(51) Int. Cl.
G06Q 40/06   (2012.01)
G06Q 20/06   (2012.01)
H04W 88/08   (2009.01)
H04L 9/32    (2006.01)
H04W 88/12   (2009.01)

(52) U.S. Cl.
CPC .......... *G06Q 20/06* (2013.01); *H04L 9/3236* (2013.01); *H04W 88/08* (2013.01); *H04W 88/12* (2013.01); *H04L 2209/38* (2013.01); *H04L 2209/56* (2013.01)

(58) Field of Classification Search
CPC ....... G06Q 40/00; G06Q 20/06; H04W 88/12; H04W 88/08; H04L 9/3236; H04L 2209/38; H04L 2209/56
See application file for complete search history.

(56) References Cited

U.S. PATENT DOCUMENTS

| | | | |
|---|---|---|---|
| 8,510,220 B2 * | 8/2013 | Rackley, III | G06Q 40/00 705/40 |
| 2007/0073585 A1 * | 3/2007 | Apple | G06Q 40/00 705/14.46 |
| 2010/0145861 A1 * | 6/2010 | Law | G06Q 40/12 705/76 |
| 2012/0072350 A1 * | 3/2012 | Goldthwaite | G06Q 20/32 705/44 |
| 2014/0046818 A1 * | 2/2014 | Chung | G06Q 40/00 705/35 |
| 2015/0287026 A1 * | 10/2015 | Yang | G06Q 20/06 705/69 |

OTHER PUBLICATIONS

Terri Bradford, Where Social Networks, Payments and Banking Intersect, Dec. 2012, Federal Reserve Bank of Kansas City, web, 2-5 (Year: 2012).*

* cited by examiner

*Primary Examiner* — I Jung Liu
(74) *Attorney, Agent, or Firm* — Law Office Of Dorian Cartwright; Dorian Cartwright

(57) ABSTRACT

An access point switches between an access point mode and a cryptomining mode. In the access point mode, the access point provides network access for end stations using a BSSID (Basic Service Set Identifier) while in the access point mode. In surveillance mode, the access point activates a mining co-processor and collectively works on problems coordinated by a stratum mining server. Artificial intelligence can be used to determine which access points to switch modes and for how long.

9 Claims, 6 Drawing Sheets

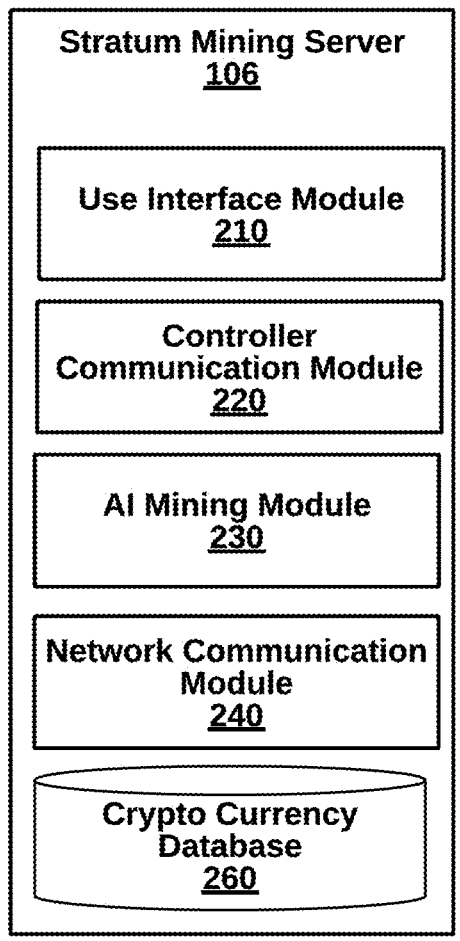
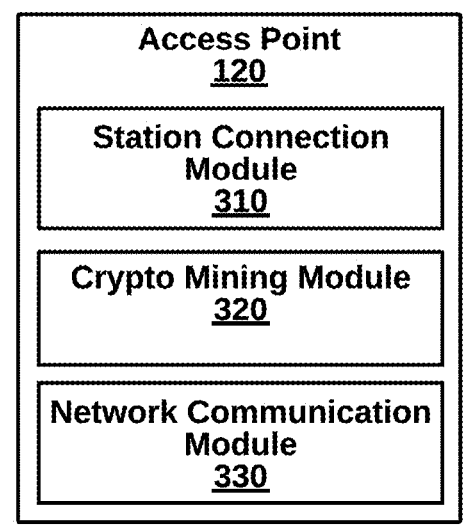
FIG. 2
FIG. 3

US 11,055,676 B2

ARTIFICIAL INTELLIGENCE FOR MINING CRYPTO CURRENCY WITH ACCESS POINT STRATUM POOLS OVER DATA COMMUNICATION NETWORKS

FIELD OF THE INVENTION

The invention relates generally to computer networking, and more specifically, to artificial intelligence for mining crypto currency with access point stratums over data communication networks.

BACKGROUND OF THE INVENTION

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances.

Typically, access points provide a port for wireless devices to access a network. At a business, several access points can be spread around a geographical region so that employees have Internet access as they travel around to different meeting rooms and even different buildings on a campus.

Crypto currency mining, or cryptomining, is a process in which transactions for various forms of cryptocurrency (e.g., Bitcoin) are verified and added to the blockchain digital ledger. Essentially, miners solve complicated math problems with cryptographic hash functions that are associated with a block containing the transaction data. Each time a cryptocurrency transaction is made, a cryptocurrency miner is responsible for ensuring the authenticity of information and updating the blockchain with the transaction. However, cryptomining is competitive and needs a computer with specialized, high-performance, processing power. The first cryptocurrency miner to crack the code is rewarded by being able to authorize the transactions and earn cryptocurrency as a reward.

What is needed is a robust technique for artificial intelligence to mine crypto currency with access point stratums over data communication networks, as described.

SUMMARY

To meet the above-described needs, methods, computer program products, and systems for mining crypto currency with access point stratums over data communication networks.

In one embodiment, a stratum mining pool of access points managed by one or more controllers is formed. Statistics about the access points are monitored (e.g., in real-time) concerning a workload of the access points in an access point mode. In the access point mode network access is provided for end stations with BSSIDs while in the access point mode;

In another embodiment, one or more access points are switched from the access point mode to a mining mode based on artificial intelligence of a stratum mining server. The mining mode combines processor power for the one or more access points to mining for crypto currency. In one case, the mode switching comprises handing-off one or more connected mobile stations from at least one of the one or more access points to a second access point as directed by one of the one or more controllers. The controller also manages the second access point. The mobile stations can maintain the same BSSID at the second access point, thereby making the mobile stations unaware of the hand-off.

Advantageously, an access point can earn cryptocurrency by cryptomining during low workload periods.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a stratum mining server of the system of FIG. 1, according to one embodiment.

FIG. 3 is a more detailed block diagram illustrating an access point of the system of FIG. 1, according to one embodiment.

DETAILED DESCRIPTION

Methods, computer program products, and systems for mining crypto currency with access point stratums over data communication networks.

Systems for AI-Based Dual Mode Cryptomining (FIGS. 1-4)

Figure 1:
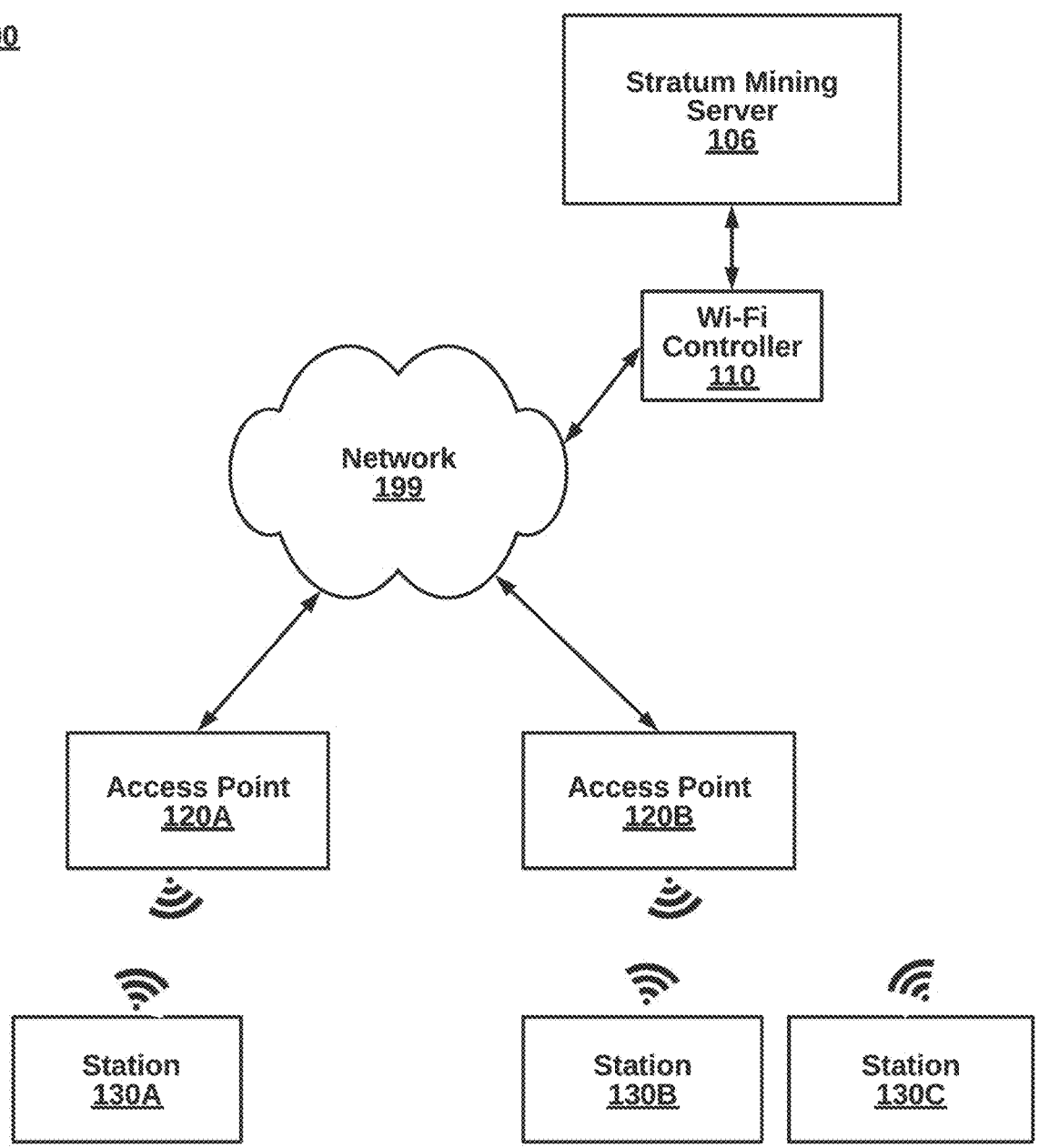
FIG. 1 is a high-level block diagram illustrating a system for mining crypto currency with access point stratums over data communication networks, according to one embodiment.

FIG. 1 is a high-level block diagram illustrating a system for mining crypto currency with access point stratums over data communication networks, according to one embodiment. The system 100 comprises a stratum mining server server 105, a controller 110, access points 120A-B, and stations 130A-C. Many other configurations are possible. For example, additional network components can also be part of the system 100, such as firewalls, virus scanners, routers, switches, application servers, databases, and the like.

Network 199 provides a data channel for components of the system 100 with network devices, such as routers, switches, network processors, and the like. The components can use data channel protocols, such as IEEE 802.11n, 802.11ac, or other versions of the 802.11 and other wireless standards. Referring specifically to FIG. 1, the stratum mining server 105, the controller 110, the access points 120A-B are each connected to the network 199, preferably over wired connections. In, turn, the stations 130A-C are coupled to the access points 120A-B over wireless connections, such as Wi-Fi.

The stratum mining server 105, in an embodiment, coordinates processing power from access points 120A,B, and others not shown, during downtimes in order to generate cryptocurrency from cryptomining using stratum protocols, network protocol, or the like. A pool of access points register with the stratum mining server 105 through the controller 110. In some embodiments, other independent controllers contribute additional access point resources. AI processes adapt which access points are pulled in on a particular task and when the are pulled in. The self-centered cryptomining operations are balanced against networking responsibilities of access points within its own local area network. To execute the balance, the access points 120A-B are switches between access point mode and cryptomining mode. In more detail, access point serving a business entity generally have low work loads at night time and on weekends, and thus, have unused processing power that can be monetized. If a station is connected, it can be handed off to a neighboring access point to allow a mode switch into cryptomining mode.

AI can be implemented in some embodiments when determining which access points to activate. Example inputs can be a local mining task, a load of an access point such as number of connected stations, amount of throughput, processing load, memory load, and a number of neighboring access points available for offloading. AI can be based on algorithms, statistical modeling and estimation models, training data, classification of inputs, neural networks, rules, and the like. In one embodiment, a downstream decision from an access point or controller can end the cryptomining for a particular device by overriding the stratum mining server 105 and switching back to access point mode, if not done so by the stratum mining server 105.

In some embodiments, the stratum mining server 105 is integrated with the controller 110. In other embodiments, the cryptomining server acts as a software-as-a-service that can be operated by a third-party using independent controllers and access points as resources.

The controller 110 manages the access points 120A,B with respect to Wi-Fi station connections, routing, and providing network-wide visibility. The controller 110, in one implementation, turns over mode switching capabilities to the stratum mining sever. In another implementation, the controller 110 approves or denies requests.

Figure 6:
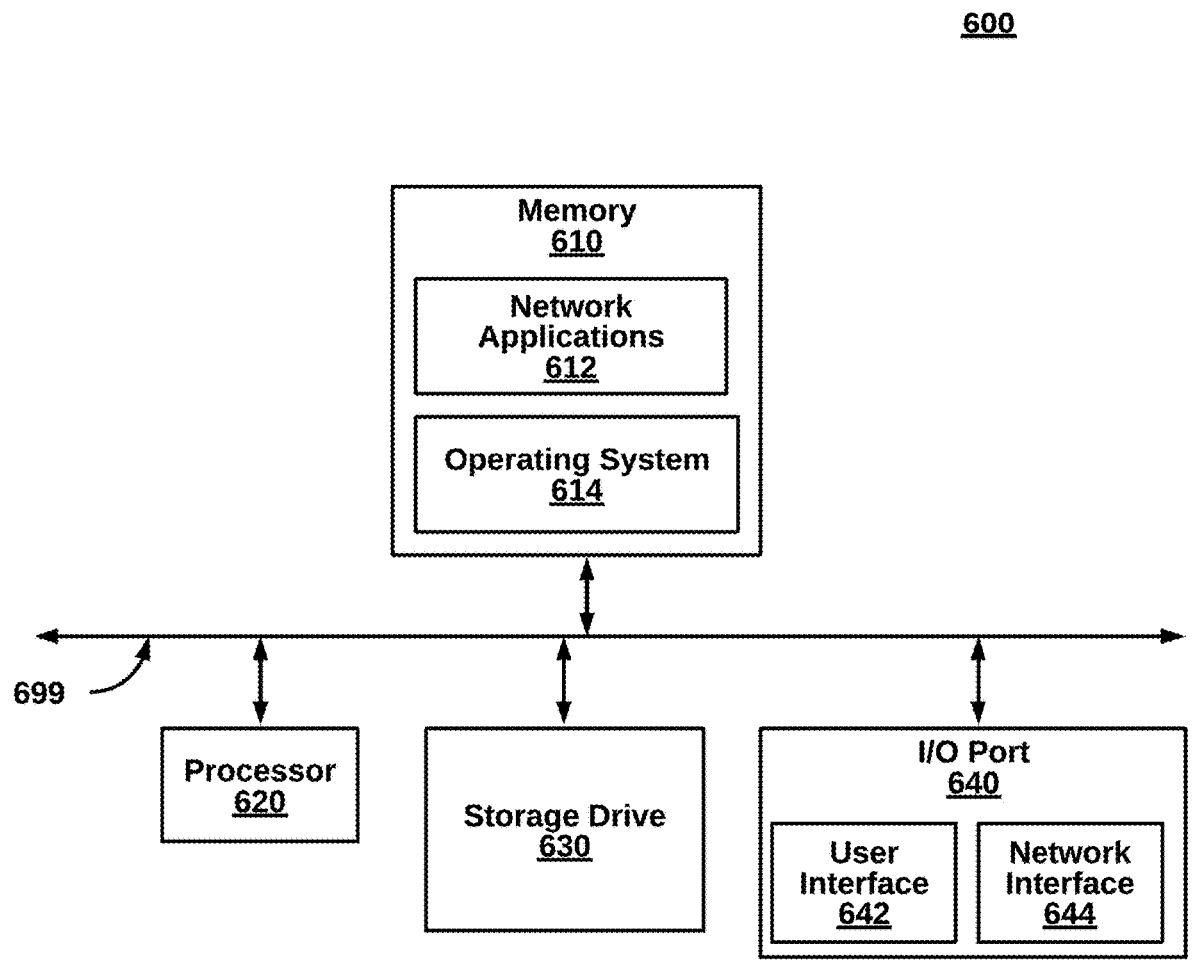
FIG. 6 is a block diagram illustrating an exemplary computing device, according to one embodiment.

The controller 110 can be implemented in any of the computing devices discussed herein (e.g., see FIG. 6). For example, the cloud-based controller 110 can be an MC1500 or MC6000 device (e.g., modified) by Fortinet of Sunnyvale, Calif.

Figure 4A:
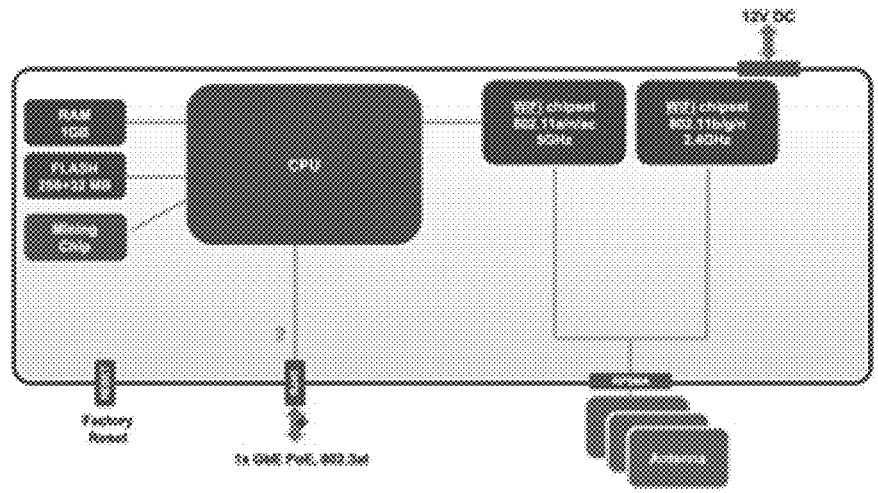
FIGS. 4A-4D are schematic diagrams of motherboards from networking devices showing mining co-processor semiconductor chips within a network device architecture, according to some embodiments.
Figure 4B:
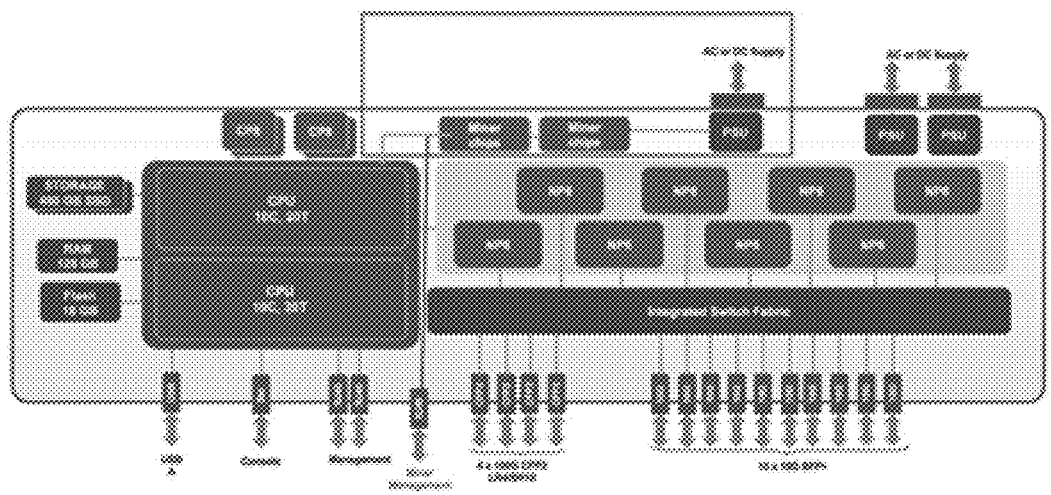
Figure 4C:
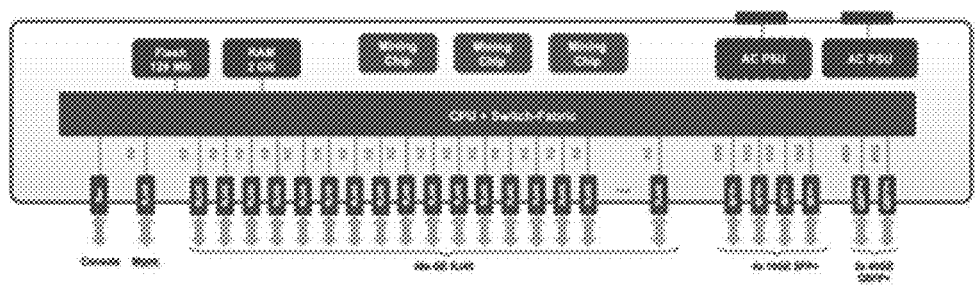
Figure 4D:
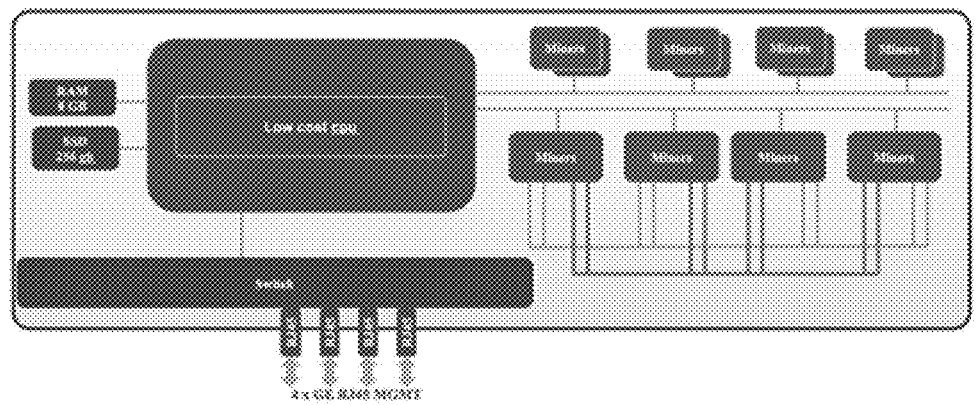
Figure 5:
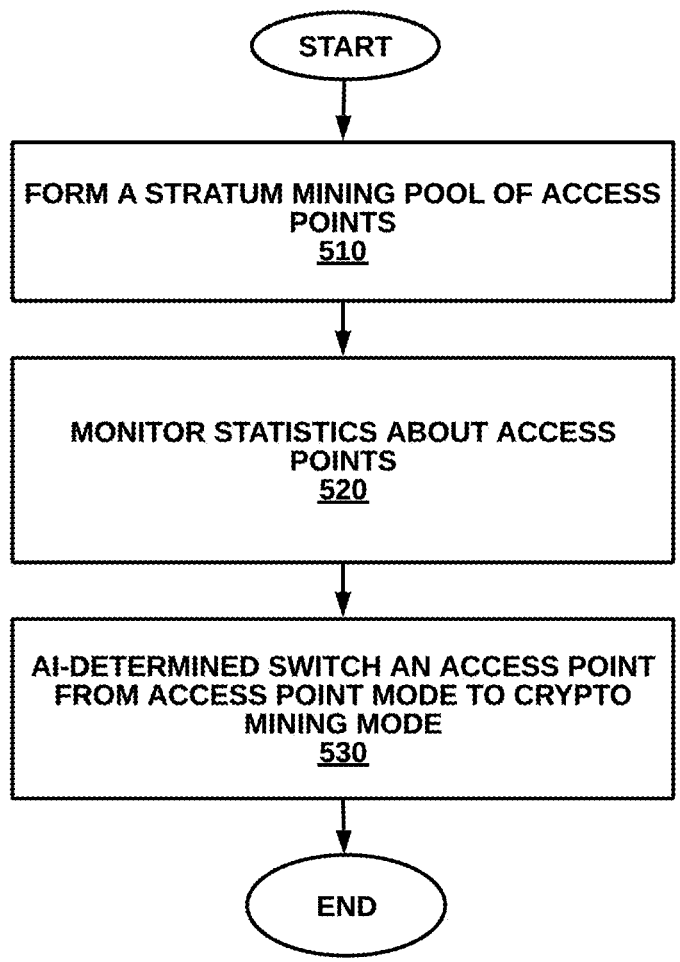
FIG. 5 is a high-level flow diagram illustrating a method for channel surveillance for anomalous devices in an access point, according to one embodiment.

The access points 120A,B connect with stations 130A-C for network access in a first mode, and mine for cryptocurrency such as Bitcoin in a second mode. The mode switch can be self-determined or ordered from upstream by the controller 110 or the stratum mining seer 110. FIG. 4A shows one implementation of an access point as a modified FortiAP 421-CM. A mining chip is a co-processor that is activated to work in conjunction with the CPU already part of the access point architecture when in the cryptomining mode. Similarly, FIG. 4B shows a gateway as a modified FortiGate 3815D-CM, FIG. 4C shows a switch as a modified FortiSwitch 548D-CM, and FIG. 4D shows an example of a mining blade that can be part of a multi-blade chassis. Many other examples are possible.

The access points 120A,B physically include one or more individual access points implemented in any of the computing devices discussed herein (e.g., see FIG. 6). For example, the access points 120A,B can be an AP 110 or AP 433 (modified as discussed herein) by Fortinet of Sunnyvale, Calif. A network administrator can strategically place the access points 120A,B for optimal coverage area over a locale. Further embodiments of the access points 120A,B are discussed with respect to FIG. 2B.

The stations 130A-C of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

FIG. 2 is a more detailed block diagram illustrating a stratum mining server 105 of the system of FIG. 1, according to one embodiment. The stratum mining server 110 comprises user interface module 210, controller communication module 220, AI mining module 230, network communication module 240, and crypto currency database 260.

User interface module 210 can be, for example, a graphical user interface, a command line interface, or any other mechanism for providing user input and output to the emergency evacuation server 105. An admin can configure access rules for controllers and access points being registered for dual mode operation. The controller communication module 220 provides a communication gateway between the stratum mining server 105 and the access points 120A,B. The AI mining module 230 is trained with data form the network and local data collected in order to continually update mining determinations. The network communication module 240 provides a secure communication channel with the controller 110 and other network devices. The crypto currency database 250 stores collective results from distributed cryptomining.

FIG. 3 is a more detailed block diagram illustrating an access point of the system of FIG. 1, according to one embodiment. A station connection module 310 tracks stations within range, connected and unconnected, and sends lists back to the controller 105. The crypto mining module 320 manages cryptomining tasks and can be in communication with the stratum mining server, according to a cooperation protocol. The network communication module 330 provides Wi-Fi connections to the stations and Ethernet connections to the controller 105 and other network devices.

Methods for AI-Based Dual Mode Cryptomining (FIG. 4)

FIG. 4 is a high-level flow diagram illustrating a method 400 for cloud-based intelligence to emergency evacuation systems using Wi-Fi access points over data communication systems, according to one embodiment. The method 400 can be implemented by the system 100 of FIG. 1 or a different system. One of ordinary skill in the art will recognize that the method 400 is non-limiting as other embodiments can have more or less steps and can be performed in a different order.

At step 410, a stratum mining pool of access pools is formed. At step 420, statistics about access points are monitored, for example, in real-time. At step 430, an access point is switched from an access point mode to a cryptomining mode using cloud-based AI.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the stratum mining server 105, the controller 110, the access points 120A-B, and the stations 130A-C. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the central locationing server 110, the access points 120A,B, and the stations 130A-C, as illustrated in FIGS. 1-3. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX54. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a stratum mining server on a data communication network, for mining crypto currency with access point stratums, the method comprising:
   forming a stratum mining pool of access points managed by one or more controllers;
   receiving statistics about the access points concerning a workload of the access points in an access point mode, wherein in the access point mode network access is provided for end stations with Basic service set identifiers (BSSIDs) while in the access point mode;
   switching one or more of the access points from the access point mode to a mining mode, wherein the mining mode combines processor power for the one or more access points to mining for crypto currency,
   wherein the mode switching comprises a hand-off of one or more connected mobile stations from at least one of the one or more access points to a second access point as directed by one of the one or more controllers, wherein the controller also manages the second access point, and wherein the one or more mobile stations maintain a BSSID at the second access point, thereby making the one or more mobile stations unaware of the hand-off.

2. The method of claim 1, wherein each access points comprises a crypto mining co-processor optimized for mining crypto currency.

3. The method of claim 1, wherein the stratum mining server directs mining for Bitcoin.

4. The method of claim 3, wherein the stratum mining server switching of one or more of the access points comprises a request to a controller managing the access point.

5. A non-transitory computer-readable medium storing instructions that, when executed by a processor, perform a method for mining crypto currency with access point stratums, the method comprising:
   forming a stratum mining pool of access points managed by one or more controllers;
   receiving statistics about the access points concerning a workload of the access points in an access point mode, wherein in the access point mode network access is provided for end stations with Basic service set identifiers (BSSIDs) while in the access point mode;
   switching one or more of the access points from the access point mode to a mining mode, wherein the mining mode combines processor power for the one or more access points to mining for crypto currency,
   wherein the mode switching comprises handing-off one or more connected mobile stations from at least one of the one or more access points to a second access point as directed by one of the one or more controllers, wherein the controller also manages the second access point, and wherein the one or more mobile stations maintain a BSSID at the second access point, thereby making the one or more mobile stations unaware of the hand-off.

6. A system with a stratum mining server, implemented at least partially in hardware to mine crypto currency with access point stratums, the system comprising:
   an artificial intelligence mining module, stored on a memory device of the stratum mining server, to form a stratum mining pool of access points managed by one or more controllers;
   a communication interface, of the stratum mining server, to receive statistics about the access points concerning a workload of the access points in an access point mode, wherein in the access point mode network access is provided for end stations with Basic service set identifiers Basic service set identifiers (BSSIDs) while in the access point mode;
   a processor, of the stratum mining server, to switch one or more of the access points from the access point mode to a mining mode, wherein the mining mode combines processor power for the one or more access points to mining for crypto currency,
   wherein the mode switching to mining mode by the processor comprises a hand-off one or more connected mobile stations from at least one of the one or more access points to a second access point as directed by one of the one or more controllers, wherein the controller also manages the second access point, and wherein the one or more mobile stations maintain a BSSID at the second access point, thereby making the one or more mobile stations unaware of the hand-off.

7. The system of claim 6, wherein each access points comprises a crypto mining co-processor optimized for mining crypto currency.

8. The system of claim 6, wherein the stratum mining server directs mining for Bitcoin.

9. The system of claim 8, wherein the stratum mining server switches of one or more of the access points is in the form of a request to a controller managing the access point.

* * * * *